UNITED STATES PATENT OFFICE.

MAX NIENSTAEDT, OF PALISADE, NEW JERSEY, ASSIGNOR TO AMERICAN FLOORING COMPANY, INC., OF NEW YORK, N. Y., A CORPORATION OF NEW YORK.

FLOOR-COVERING COMPOSITION.

1,190,942.  Specification of Letters Patent.  Patented July 11, 1916.

No Drawing.   Application filed July 23, 1913.  Serial No. 780,651.

*To all whom it may concern:*

Be it known that I, MAX NIENSTAEDT, a citizen of the Republic of Switzerland, residing at Palisade, New Jersey, and whose post-office address is No. 1170 Broadway, borough of Manhattan, New York city, have invented the following-described Improvements in Floor-Covering Compositions.

The floor covering composition is of the kind that is prepared in plastic state, and applied in such condition to the surface or floor to be covered, where it is adapted to set or harden to form the finish surface of the floor.

The invention consists essentially in the combination of a cement binder component with a body component which comprises a portion of tough vegetable fiber, each of the fibers thereof being split longitudinally and intimately mixed with the cement and other ingredients.

In the course of many experiments, I have discovered that tough vegetable fiber, when cut in about one-quarter inch lengths, can be satisfactorily combined with the cement binder to increase the tensile strength of troweled floor compositions, and that when such fiber are also split lengthwise into one or more longitudinal sections, a further improvement is gained in that the resulting composition has a finer texture and much greater strength, besides lending itself to easier manipulation during the process of troweling it upon the surface to be covered.

I have found that the split fibers are softer and more pliable than the whole fiber, and are hence adapted to mix more thoroughly with the other ingredients and to take the color better, and also that by reason of the roughness or jaggedness of their surfaces produced by the splitting, they are more firmly anchored in their cement investment, and each fiber thus contributes its full tensile strength to the floor covering.

The tough vegetable fiber which I prefer is commercial istle fiber, because it is perhaps the toughest fiber known, the same being a species of *Agave*, but other tough vegetable fibers, for example, hemp or sisal, are likewise serviceable. These fibers are normally stiff, and though somewhat angular in section, are smooth on their outer surfaces so as to be more or less shiny, particularly when the dried sap and parenchyma have been rubbed off. They may be split up for the purposes of this invention by a beating process, such as may be carried out in a commercial power shredder, producing a relatively soft mass of split fibers about one-quarter inch in length, each fiber presenting a rough or irregular surface adapting it to interlock with the cement and adjacent fibers.

In preparing the body component of the composition involving my invention, I proceed as follows: To a quantity of resilient granular material, such as cork-flour, I add about an equal quantity by weight of istle fiber, split or shredded as above described. These fibers are about one-quarter inch in length, a longer length being objectionable in that it interferes with the smoothness of the troweled surface. To this mixture I add a similar or slightly less amount of asbestos, the latter being added for the purpose of affording smoothness to the surface and denseness to the composition, and for the same purpose I then add a mixture of about equal parts of clay and silex, the amount added depending upon the character of floor desired, and as will be understood by those who are skilled in this art. I usually add an amount of such filler, *i. e.*, clay and silex, equal at least to 50 per cent. of the weight of the cork and istle fiber, and preferably as much as 75 or 90 per cent. These ingredients, with the pigment added, are then thoroughly mixed with the binder component for which I use about twice their weight of cement, such as dry magnesium oxid, mixed with a solution of magnesium chlorid in water and of a density of about 23 Baumé,—the amount of solution used being sufficient only to reduce the mixture to the consistency of stiff dough. This mixture is thoroughly kneaded until the cement binder has become intimately mixed with the granular material, and especially with the split fibrous material. Oil is then added, linseed being a suitable oil, and thoroughly worked into the mass, as by continued kneading. until its consistency is suitable for troweling, whereupon it is applied to the floor and allowed to set.

It will be understood that the proportions of the ingredients may be varied from the amount above give, thereby altering in one way or another, the character of the finished floor. Thus the use of a larger quantity of cement will tend to make the floor covering harder and less resilient. Larger quantities of inert filler, such as the clay and silex, up to about 100 per cent. of the ground cork and fiber, will tend to give a closer grain to the surface, while added istle fiber will, to some extent, increase the toughness as well as the resilience of the covering, although in excess it will interfere with the troweling, which is important to avoid; all of which will now be obvious to those skilled in this art without further description.

By the shredding of the istle fiber, it is possible and also desirable to use somewhat more of that material than of the ground cork flour or asbestos, as the composition is then in its toughest state and best adapted to resist wear as well as strains tending to produce cracks. When the composition has set, it forms into a homogeneous, dense, but elastic mass or layer, having a horn-like feel and appearance, and possessing even greater tensile characteristics than is found in ordinary Portland cement.

As illustrating the application of the invention for making harder floor surfaces, I may take 10 per cent. of the split istle fiber, 4 per cent. silex, 6 per cent. asbestos and mix them together dry as the body component, with 62 per cent. plaster of Paris and 10 per cent. magnesium oxid as the binder component, the balance being pigment. This mixture is mixed with ordinary water, into which sugar has been added in the proportion of one liter of water to 800 grams of sugar, and then troweled on the floor in the usual way. It will be understood, however, that the character of the body and binder components may be varied indefinitely according to the character of the ingredients and the kind of floor desired, it being only essential that the split fiber be combined with the cement and the other ingredients in such manner as to form a mechanical bonding throughout the mass of the product floor.

I claim:

1. A floor composition adapted for application to the floor in plastic state, and comprising a cement binder component and a body component including tough istle-like vegetable fibers, the latter being split longitudinally and intimately mixed with the cement and other ingredients.

2. A floor composition adapted to be prepared and applied in plastic state, comprising a granular resilient material mixed with split istle fiber, a filler and a cement binder, the whole being mixed with oil and allowed to set.

3. A floor composition adapted for application to the floor in plastic state and comprising a cement binder component consisting of magnesite cement and a body component including granular cork, longitudinally split istle-like vegetable fibers, a mineral filler containing asbestos and clay, and oil, all intimately mixed together and adapted to trowel freely upon the surface to be covered.

In testimony whereof I have signed this specification in the presence of two witnesses.

MAX NIENSTAEDT.

Witnesses:
 MITCHELL HALL,
 F. A. JOHNSON.